Aug. 13, 1957  E. M. McNATT  2,803,001
WAVE DETECTION IN SEISMIC PROSPECTING
Filed June 2, 1952  2 Sheets-Sheet 2

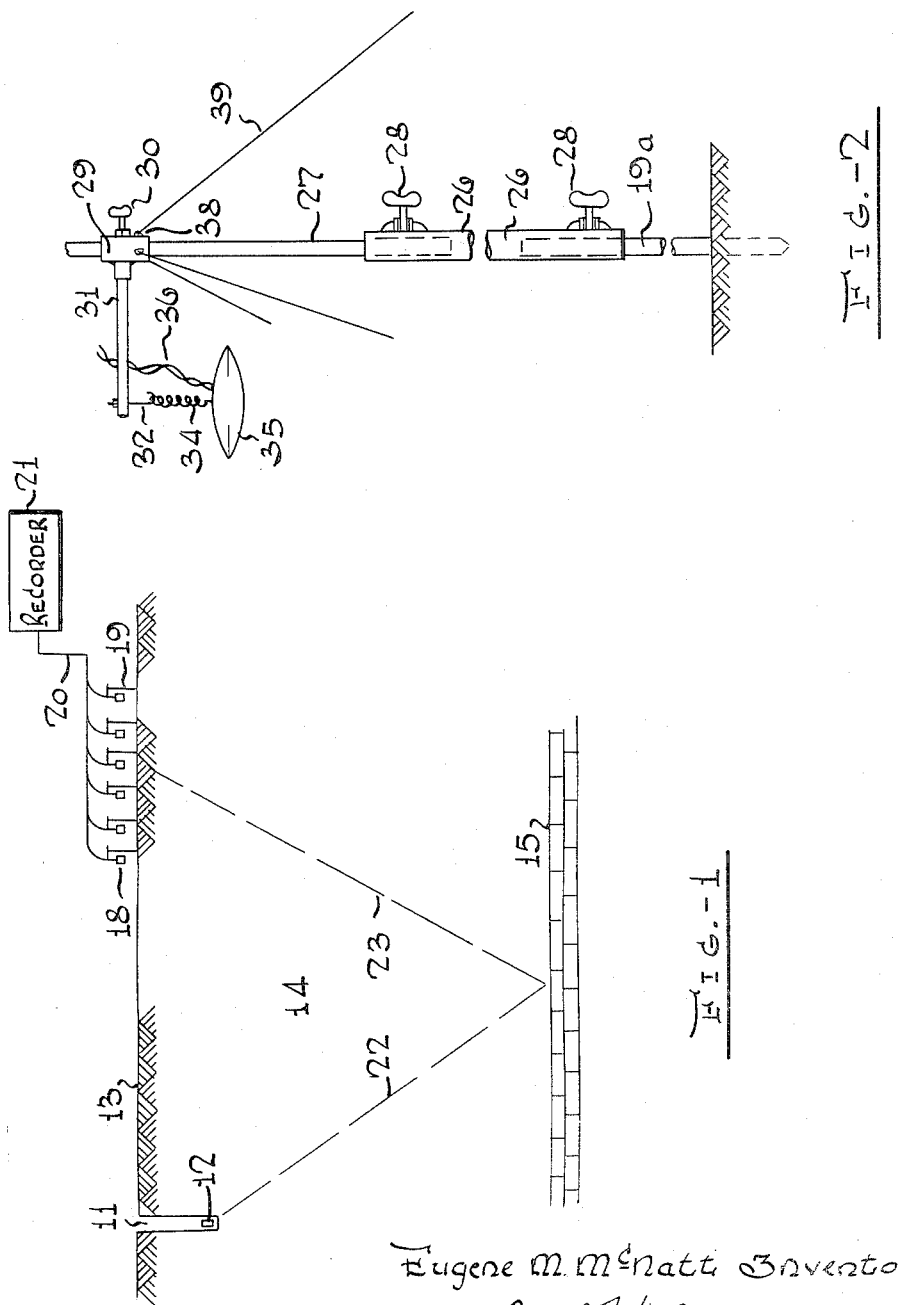

Eugene M. McNatt Inventor
By W. O. Heilman Attorney

United States Patent Office 2,803,001
Patented Aug. 13, 1957

2,803,001

WAVE DETECTION IN SEISMIC PROSPECTING

Eugene M. McNatt, Tulsa, Okla., assignor to Esso Research and Engineering Company, a corporation of Delaware Application June 2, 1952, Serial No. 291,093

9 Claims. (Cl. 340—15)

This invention relates to improvements in the art of seismic prospecting. More particularly the invention concerns improvements in the detection of seismic waves that have travelled through the earth from a source of seismic impulses, advantage being taken of the sound transmission properties of air to average out some of the complex motions that occur and thus give a simpler and more easily interpreted record.

A method commonly employed in searching for areas likely to contain oil or other mineral deposits is that known as seismic prospecting wherein a seismic disturbance is initiated at a selected point in or on the earth's surface as, for example, by detonating an explosive charge in a shot hole, which causes seismic waves to travel through the earth and to be reflected from various substrata, the upward traveling reflected waves being detected at a number of points spread out in a desired pattern from the point of the initial seismic disturbance. Sensitive pick-ups, called seismometers, or geophones, are arranged at the detection points to translate the detected motion into electrical impulses which after suitable amplification are recorded on a seismograph. The records may be in the form of waves or traces representative of the seismic waves that have been picked up by the individual geophones or they may be in the form of variable density or variable area record and in each case will be plotted as a function of time along the record, suitable timing marks being simultaneously made on the record so that when the same is later examined it will be possible to determine the length of time required for the arrival of the detected waves at any particular one of the detection points. From other data obtained in the area being studied, for example, seismic wave velocities in the various earth layers, it is then possible to estimate the depth of the various substrata.

Although it is theoretically possible to time the arrival of a reflected seismic wave by the use of a single geophone and recording device, in practice it is usually difficult and sometimes impossible to pick out indicated reflection waves from a number of other earth vibrations that are detected and recorded at the same time. Therefore the usual practice is to employ a plurality of seismometers spread over a considerable distance along the earth's surface in a selected pattern as just described and to make plurality of traces in side-by-side relation on a single chart for purposes of comparison, since a reflection from a well-defined stratum will appear on the record as a wave form of increased amplitude on all the traces in some definite time relation, thus permitting the reflection to be "lined up" on the record.

It has been found that when difficulty is encountered in obtaining suitable reflections on the record in some prospecting areas, significant improvements in the ratio of usable to spurious signals or, in other words, in the ratio of reflection to non-reflection energy can often be obtained by using a plurality of geophones at each detection station connected so that their outputs add together, the combined signal being recorded as a single trace on the record. This serves to average out some of the complex earth motions associated with the seismic disturbance and thus give a simpler record.

It is evident that although the use of a plurality of geophones at each detection station produces many advantages the practice does add to the time and labor involved in making each record as well as adding to the investment cost. It is one object of the present invention to provide a method and means for detecting transmitted seismic waves without requiring a large number of geophones at each detection station while at the same time obtaining the advantages of using a plurality of geophones.

In accordance with this invention a microphone is placed a few or several feet above the ground at each detection station, the microphone serving to detect compressional waves, which are transmitted to the air, while shear waves and other waves having no vertical component motion are not. The sound input to the microphone will be essentially the same as that which would be produced by an infinite number of geophones placed over an area on the ground, the size of this area depending upon the height of the microphone above the ground.

The nature and objects of this invention will be readily appreciated when consideration is taken of the ensuing description and the accompanying drawing in which:

Fig. 1 is a diagrammatic representation of a general arrangement of a spread of microphones suspended adjacent the ground in an area being prospected as related to a source of seismic energy and a selected subsurface layer from which reflected energy is to be detected;

Fig. 2 is an elevational view of an arrangement for suspending microphones at a selected distance above the earth at each detection point;

Figure 4:
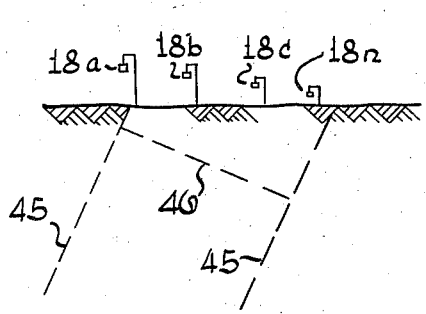
Figure 5:
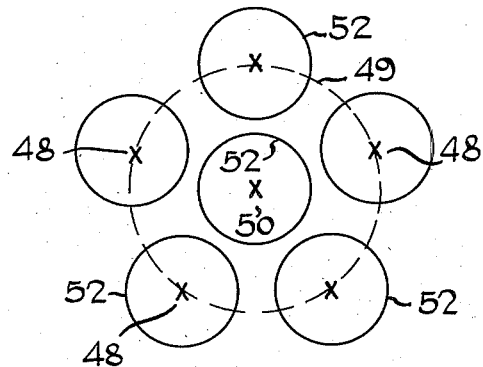

Fig. 4 is a schematic representation of a plurality of microphones arranged in spaced vertical and horizontal relation to emphasize the detection of a deflection from a relatively shallow subsurface layer; and Fig. 5 is a diagrammatic comparison of the areal coverage obtained with a horizontal area pattern of microphones suspended above the ground and a like pattern of geophones arranged on the ground.

With particular reference to Figure 1 a schematic representation is shown of a vertical section of the earth in an area being prospected. As in conventional seismic prospecting a shot 11 is drilled into the earth and an explosive shot 12 is placed in the shot hole and detonated. The seismic waves that are thus generated travel downwardly through the various layers of the earth 13 and 14 and some of the energy is reflected upwardly by a reflective layer such as 15. To detect the upwardly traveling energy a plurality of microphones 18 are supported on stakes 19 preferably arranged in line with and at some distance from the shot hole 11. The outputs from the microphones are sent through cable 20 to a conventional seismic recorder 21. That portion of the reflected seismic energy from layer 15 that reaches the microphones will have traveled in a general direction indicated by dashed lines 22 and 23.

The mechanism involved in the detection of the received seismic energy by the microphones may be briefly described as follows: If it is assumed for the purpose of this discussion that reflections from deep beds arrive at the earth's surface in an essentially vertical direction, the ground motion at the surface may be considered to exist of an in-phase vertical component plus numerous closely spaced pulses of a random nature. These pulses will be of at least three types, namely, compressional waves, shear waves, and surface waves of the Rayleigh variety. Of this combination motion, only the compressional waves will be transmitted to the air. Therefore a microphone placed, for example, ten feet above the earth's surface will receive a pulse produced by a seismic reflection from a subsurface bed plus numerous random pulses representing the closely spaced complex motions referred to above. These latter pulses will be largely canceled out because of their random nature and the electrical impulses from the output of the microphone will be essentially representative of the reflected pulses from the subsurface layer.

One arrangement that may be employed for suspending the microphones is shown in Fig. 2. A stake or rod 19a is driven into the ground and has a tubular extension 26 into which is slidably fitted a rod 27, the tubular extension and the rod being held at desired heights by means of clamps 28. Fitting slidably over rod 27 is a T-shaped collar 29 supporting a horizontal arm 31. The collar is held at any desired height on the rod 27 by means of the clamp 30. Fastened to arm 31 is a hook or bracket 32 holding a spring 34 which in turn supports a microphone 35, the latter being preferably enclosed in a spheroidal or ellipsoidal case as shown in order to reduce wind noise to a minimum. Spring 34 is so selected as to reduce vibrations from earth motion and from the wind and the like to a minimum. Output leads 36 are connected into a cable leading to the recording truck, as for example the cable 20 of Fig. 1. A plurality of eyes 38 are provided on collar 29 to receive guy wires 39 which may be fastened to the ground with suitable stakes to make the microphone support more rigid.

Preferably the microphone 35 is supported at a height of from 6 to 30 feet above the ground although it may be placed as close as one or two feet above the ground or as high as 40 feet above the ground. The microphone should have an adequate response to frequencies in the range of 20 to 80 or 100 cycles per second to be satisfactory for use with this invention. In place of microphones it is also possible to use low-frequency-response dynamic loud speakers.

As previously stated, the sound input to the microphone will be essentially the same as would be produced by an infinite number of geophones placed over an area on the ground, thus giving the advantages commonly obtained by multiple geophones but to a greater degree, and by the use of a single detector. In addition, the use of microphones suspended above the ground in accordance with this invention has at least one further advantage. Because of the low velocity of sound in air as compared to its velocity in the earth the use of an array of microphones spaced vertically is simpler and much more practical than the use of similar arrays of geophones placed in the ground. For example a more highly directional receiver than that afforded by a single microphone as shown in Fig. 2 can be provided by using a plurality of microphones supported one above the other, connecting the microphones in parallel with suitable time delays to emphasize the pulses arriving in a vertical direction. The use of a similar arrangement of geophones spaced vertically in the ground is well known and is described for example in U. S. Patent 2,087,702 of Leo J. Peters. However, the arrangement herein disclosed where a plurality of vertically spaced microphones is used arranged above the ground has an advantage over the prior disclosure in that no drilled hole is required for placement of the detectors and in addition the microphones may be spaced more closely together than the geophones because of a much lower velocity of sound in air as compared to its velocity in the subsurface. For example a group of microphones spaced over one wave length would occupy a height of say 20 ft. as compared to an array of geophones in a drilled hole covering a depth of 100 ft. or more.

Figure 3:
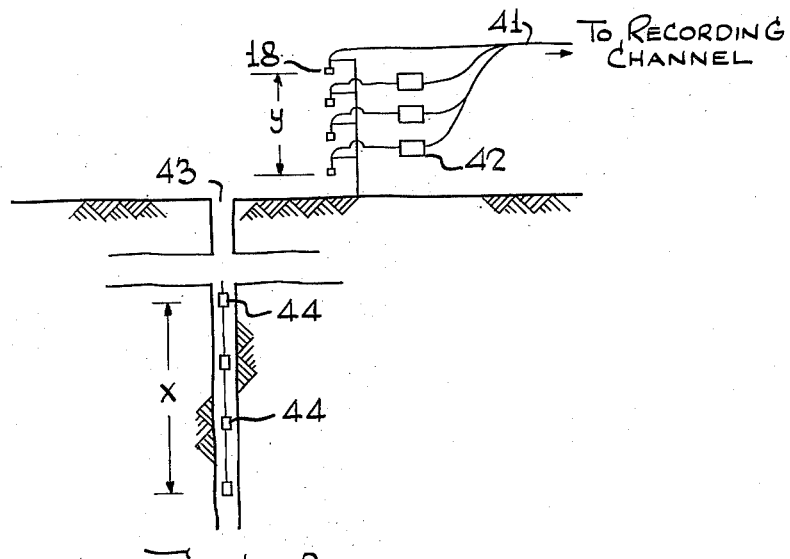
Fig. 3 is a schematic representation of a plurality of microphones arranged in spaced vertical relation above the ground and compared with a similar vertical array of geophones placed in a borehole.

This is illustrated schematically in Figure 3 wherein there are shown an array of four microphones 18 positioned above the ground and a similar arrangement of geophones 44 placed on a borehole 43. The outputs from the microphones 18 are combined and fed to a recording channel on a seismograph through line 41, suitable time delay means 42 being placed between some of the microphones and line 41 to make up for the difference in travel time to the microphones so that their outputs will add in phase for upwardly travelling waves. Similar time delay means are used in the geophone array placed in the borehole as disclosed in the aforementioned Peters patent but these means are not illustrated here. Assuming that for proper directional effect it is desired to have a delay of 20 milliseconds between the arrival of a wave at the lowermost detector and the highest detector in each of the arrays and assuming the velocity of sound in the earth adjacent the geophones to be 5500 ft. per second as compared to 1100 ft. per second in air, the distance $x$ between the uppermost and lowermost geophohne will be 110 ft. whereas the distance $y$ between the uppermost and lowermost microphone will need to be only 22 ft.

Detection of reflections from relatively shallow beds can be emphasized by arranging the microphones laterally as well as vertically as shown in Fig. 4. For example to emphasize a reflected wave travelling in the general direction indicated by lines 45 and having a wave front indicated by line 46, the several microphones 18a, 18b, etc. may be arranged so that their heights above the ground decrease with distance from the seismic source, i. e., so that they lie along a line that generally parallels the wave front of the waves to be detected. Because of refraction effects the wave front will make a slightly different angle with the horizontal after passing from the earth to the air but this angle is readily determined by calculation and the microphones can be arranged accordingly.

It is also contemplated in the present invention to employ a plurality of microphones arranged over an area with their outputs tied to a single trace on the seismograph record much in the same manner as is done with multiple geophones. For example, a so-called star pattern may be employed using an array of six microphones as illustrated in Fig. 5 where five of the microphones are placed at points 48 that lie at equidistant positions on circle 49 and the sixth microphone is placed at 50 in the center of the circle. With geophones positioned at the six points indicated with their outputs all tied to the same seismograph trace an averaging effect over the array defined by circle 49 will be obtained but the ground motion actually detected will be that essentially occurring at points 48 and 50 whereas with microphones at the same six points the microphone will detect and average out motion over the areas defined by circles 52. It is thus readily apparent that a greater averaging effect will be obtained with the microphone array than with the geophone array.

Another advantage of the areal pattern using a plurality of microphones tied together as illustrated is that it will tend to cancel out wind noise. This advantage is obtained particularly in a pattern such as shown in Fig. 5 where no more than two microphones lie in any single straight line, thus making the noise cancellation effect equally effective with any wind direction.

There is another advantage inherent in the use of microphones placed above the surface of the earth as seismic detectors. Experience has shown that in addition to the reflection pulse reaching the earth's surface, which can be pictured as moving the ground surface as a whole in a generally vertical direction, there is considerable random motion superimposed on the pulse, which can be pictured as moving various portions of the ground in different directions at the same instant. Evidence for this is that the outputs from two geophones placed one to two feet apart, for example, will often indicate ground motion at one of the geophones that is 180° out of phase with the motion at the other geophone. It is evident that in order to average out all of this random motion over a given area in such a case it would be necessary to combine the outputs of geophones placed no more than two feet apart over that area. In contrast to this, use of a single microphone, as in the present invention, placed for example 15 feet in the air, would average out the ground motion over a circular area of say 25 feet in diameter.

It is not intended that this invention be limited to the specific examples given, for the scope of the invention is determined by the following claims.

What is claimed is:

1. In a method of seismic prospecting wherein a seismic disturbance is initiated adjacent the earth's surface to generate seismic waves and the generated waves travelling through the earth are detected adjacent the earth's surface at one or more points removed along the earth's surface from the initiating point the improvement which comprises the detection of the waves by means of at least one microphone suspended at from 1 to 40 feet above the earth's surface at a selected detection point.

2. In a system for profiling geological substrata the combination of a seismic disturbance source arranged adjacent the surface of the earth at a selected initiating point and at least one microphone suspended in the air above the earth's surface and adjacent thereto at a selected detection point removed along the earth's surface from said selected initiating point.

3. System as defined by claim 2 wherein the microphone is suspended at a distance of from 1 to 40 ft. above the ground.

4. System as defined by claim 2 including a plurality of microphones positioned in vertical relation at said detection point, a time delay for at least one of said microphones, and means combining the outputs of said microphones through said time delay.

5. System as defined by claim 2 including a plurality of microphones positioned above a plurality of selected detection points defining an area and means combining the outputs of said microphones.

6. System as defined by claim 5 wherein said plurality of detection points are symmetrically arranged so that not more than two points lie on a straight line.

7. System as defined by claim 2 including a plurality of microphones arranged laterally in spaced relation along a line generally parallel to the energizing wavefront of waves whose detection is to be emphasized.

8. In seismic geophysical surveying the improvement comprising receiving at a plurality of spaced points in the air above the ground surface the seismic waves which are transmitted from said surface into the air.

9. Apparatus for receiving and recording seismic waves comprising a spread of acoustical transducers, means supporting said transducer spread in the air above a ground surface, and recording means connected to and actuated by said transducers.

References Cited in the file of this patent

UNITED STATES PATENTS

| | | |
|---|---|---|
| 2,452,515 | Athy | Oct. 26, 1948 |
| 2,544,819 | Bobb et al. | Mar. 13, 1951 |
| 2,580,636 | Wolf | Jan. 1, 1952 |
| 2,622,691 | Ording | Dec. 23, 1952 |
| 2,654,874 | Press | Oct. 6, 1953 |